United States Patent
Goodman et al.

(10) Patent No.: US 6,898,480 B2
(45) Date of Patent: May 24, 2005

(54) USE OF CARTRIDGE MEMORY FOR STORING LOGICAL LIBRARY ASSOCIATION INFORMATION

(75) Inventors: Brian Gerard Goodman, Tucson, AZ (US); Leonard George Jesionowski, Tucson, AZ (US); Dietrich Etzel, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 10/356,577

(22) Filed: Feb. 3, 2003

(65) Prior Publication Data

US 2004/0153206 A1 Aug. 5, 2004

(51) Int. Cl.⁷ .................................................. G06F 7/00
(52) U.S. Cl. .................. 700/213; 700/214; 700/215
(58) Field of Search ............................ 700/213, 214, 700/215, 218, 219

(56) References Cited

U.S. PATENT DOCUMENTS

| | | | |
|---|---|---|---|
| 5,164,909 A | * 11/1992 | Leonhardt et al. | 700/215 |
| 5,761,503 A | 6/1998 | Fisher | 711/170 |
| 5,786,955 A | * 7/1998 | Kori et al. | 360/72.1 |
| 5,819,309 A | * 10/1998 | Gray | 711/111 |
| 5,963,971 A | 10/1999 | Fosler et al. | 711/114 |
| 6,088,182 A | * 7/2000 | Taki et al. | 360/71 |
| 6,185,165 B1 | 2/2001 | Jesionowski et al. | 369/34 |
| 6,195,007 B1 | 2/2001 | Takayama et al. | 340/572.1 |
| 6,286,079 B1 | 9/2001 | Basham et al. | 711/112 |
| 6,314,338 B1 | 11/2001 | Billington | 360/92 |
| 6,336,163 B1 | 1/2002 | Brewer et al. | 711/112 |
| 6,421,196 B1 | * 7/2002 | Takayama et al. | 360/71 |

* cited by examiner

*Primary Examiner*—Gene O. Crawford
(74) *Attorney, Agent, or Firm*—Allen K. Bates

(57) ABSTRACT

An automated data storage library is partitioned into multiple logical libraries. A cartridge memory attached to each data storage cartridge in the library is used to hold library identification information. The library identification information is used to associate each data cartridge with one or more logical libraries. The library identification information may also be used to associate each data storage cartridge to an automated data storage library.

45 Claims, 10 Drawing Sheets

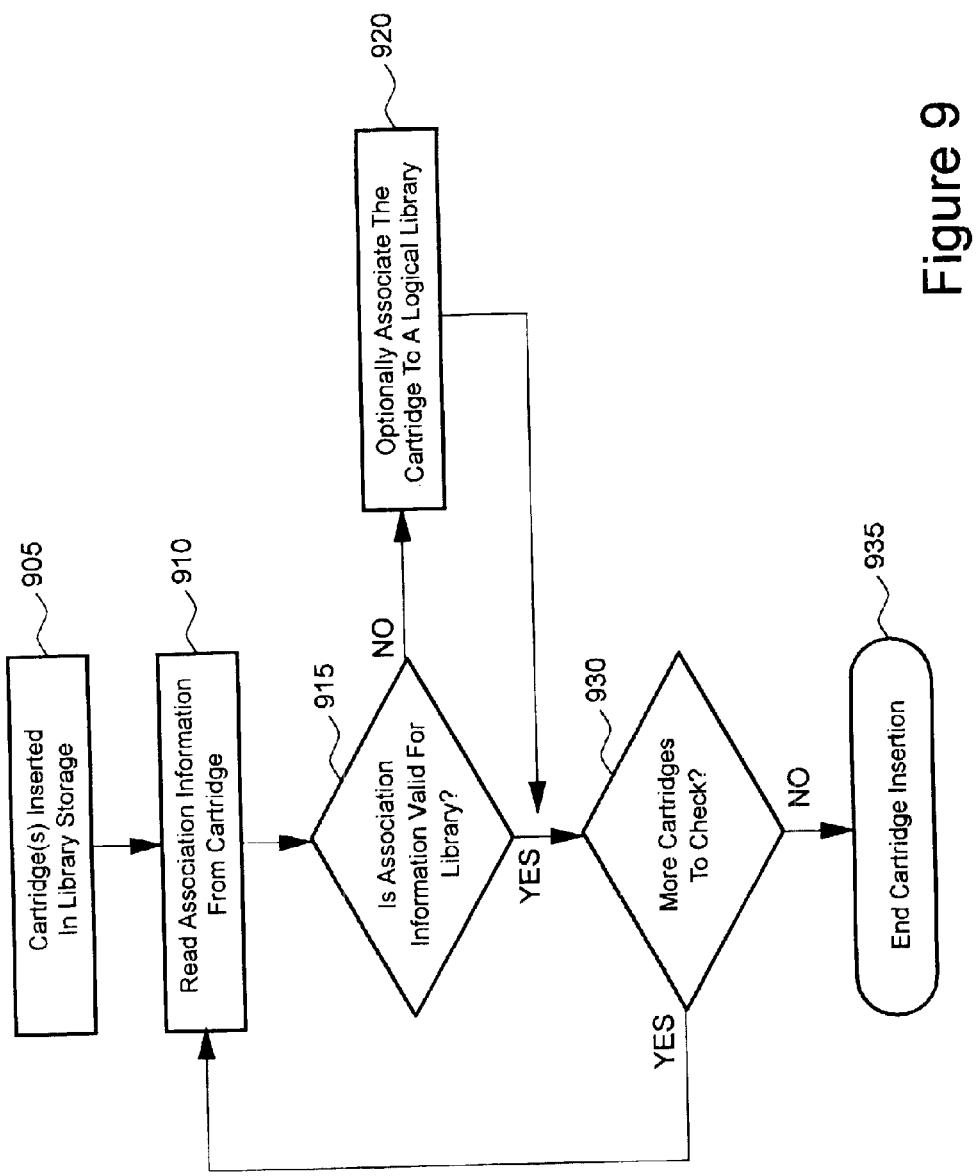

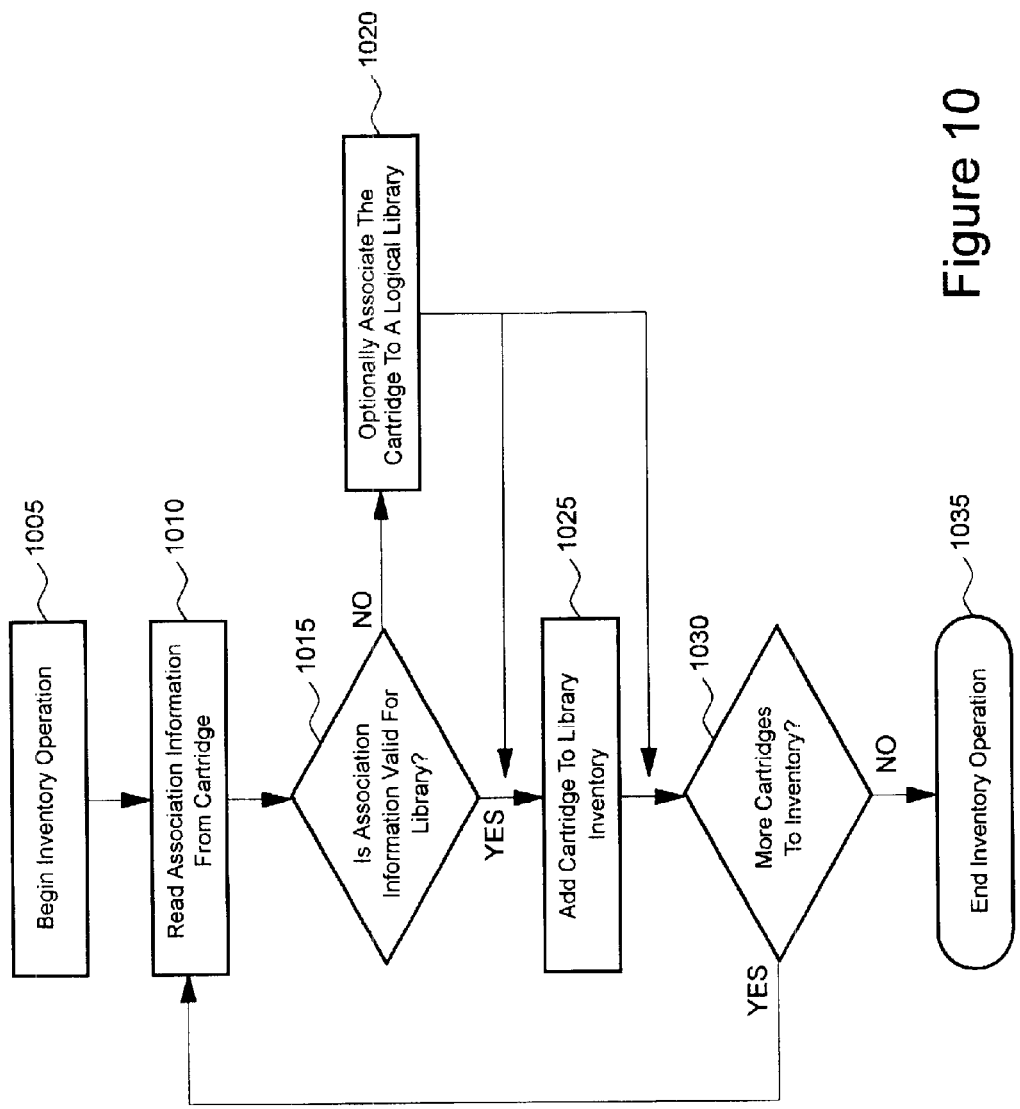

USE OF CARTRIDGE MEMORY FOR STORING LOGICAL LIBRARY ASSOCIATION INFORMATION

TECHNICAL FIELD

This invention relates to automated data storage libraries which transport portable data storage media cartridges between storage shelves and read/write drives, and, more particularly the invention concerns a system to identify and track the cartridges by the use of identification information contained in a memory device located inside the cartridge.

BACKGROUND OF THE INVENTION

Automated data storage libraries are known for providing cost effective storage and retrieval of large quantities of data. The data is stored on data storage media that is typically contained within a cartridge and referred to as a data storage media cartridge. The media comprises magnetic media (such as magnetic tape or disks), optical media (such as optical tape or disks), electronic media (such as PROM, EEPROM, flash PROM, Compactflash™, Smartmedia™, Memory Stick™, etc.), or other suitable media. The data storage library contains data storage read/write drives that store data to, and/or retrieve data from the data storage media. The cartridges are stored inside the library in storage shelves when not in use by the data storage drives. One or more robot accessors retrieve selected cartridges from the storage shelves and provide them to data storage drives. Generally, data storage libraries contain a large number of storage shelves to place the cartridges when the cartridges are not in use by a read/write drive. Each storage shelf that may contain a cartridge is referenced or located by the library by a storage shelve address. The data storage library typically includes control electronics that direct the accessors operation, communicate with the read/write drives and interface to one or more host computers to transfer data between the host computer and the data storage library. Typically, data stored on data storage media of an automated data storage library, once requested, is needed quickly. Thus, it is desirable that an automated data storage library be maintained in an operational condition as much as possible, such as the well known "24×7×365" availability.

Various companies manufacture automated data storage libraries, and each company has libraries with different features. Early data storage libraries could only operate with a single host computer. Automated data storage libraries now offer the capability of sharing the entire library with a plurality of host computers. Any host computer that is attached to the library may obtain access to all, or part of the cartridges in the library. The IBM 3584 Ultra Scalable Tape Library is an example of a product that has the internal capability to allocate read/write drives and storage shelves to multiple host computers. The data storage library can be divided into two or more logical libraries, where the robotics and electronics are usually shared throughout the library; however, the storage shelves and read/write drives are assigned to one of the logical libraries and are not shared.

One problem with supporting multiple logical libraries within a single data storage library is the management and tracking of each cartridge. For example, if storage shelve locations are used to differentiate cartridges that belong to different logical libraries then the cartridges may be moved around by an operator while a door is open or the library is powered off. The association of a cartridge to a logical library must be maintained so that a cartridge assigned to one logical library does not accidentally end up with another logical library.

U.S. Pat. No. 6,185,165 describes a method of physically partitioning the library storage and drives into physical areas that are associated with particular logical libraries. One problem with U.S. Pat. No. 6,185,165 (and other physical mapping solutions) is that it establishes a physical relationship between logical libraries and their associated storage. This makes certain desirable library features difficult (or even impossible) to implement, such as floating home cell (where the physical location of a cartridge can move for better library efficiency) or logical library spanning (where additional storage for a logical library may appear outside the existing range of storage slots). In addition, if a cartridge is moved by an operator then the logical library association would change, allowing the wrong host computer to access the media.

One solution would be the use of organization tables, where each cartridge is associated with a particular logical library, based on the cartridge label. One problem with this approach is that very large libraries could consume a large amount of memory to store the information needed to maintain the logical library association for each cartridge. In addition the storage would have to be nonvolatile to prevent the loss of the information when the library is powered off. A duplicate copy of the information would also be necessary to safeguard against losing the information in the event of a nonvolatile memory failure or component replacement. Another problem is that it requires properly labeled media. Some customers do not want labels on their cartridges and others want to control and perform their own cartridge labeling. Defective labels that cannot be read properly can cause problems.

U.S. Pat. No. 5,761,503 describes a method where cartridge labels are used to associate a particular cartridge with a particular logical library. Cartridge ranges are assigned to logical libraries and any cartridge label that falls within the range will be associated with that particular logical library. While the use of cartridge label ranges have the potential to use less nonvolatile storage space then organization tables, it still requires properly labeled media. Importing media into a specific logical library may not be possible unless the cartridge label is changed. Supporting range gaps or fragmented ranges using labels could result in large memory requirements to store all of the ranges.

In view of the foregoing, there is a need for a more flexible and reliable system for the management and tracking of cartridges in a data storage library.

SUMMARY OF THE INVENTION

It is an object of the present invention to provide a more reliable management and tracking system for data storage cartridges in a data storage library.

Another object of the present invention is to use association information in a memory device located inside the cartridge to associate the cartridge with one of a plurality of logical and/or data storage libraries.

Another object of the present invention is to write information to a memory device located inside the cartridge to associate the cartridge with one of a plurality of logical and/or data storage libraries.

A further object of the present invention is to read the cartridge memory located inside the cartridge upon a library power up or other library controller directed operation so that any or all of the cartridges can be associated with any of a plurality of logical and/or data storage libraries.

Disclosed are an apparatus, a system, a method, and a computer program product for the use of association information stored in a memory device located inside the cartridge to identify a cartridge. The library controller uses the association information to associate the cartridge with a particular logical and/or data storage library. Most modern data storage cartridges support this memory device and it is typically referred to as cartridge memory. By using this association information the library controller is able to associate the cartridge quickly and efficiently even under adverse or unexpected operating conditions, and therefore provide reliable management and tracking of data storage cartridges in a data storage library.

In one embodiment, a portion of the cartridge memory is used to indicate the logical library that the cartridge is associated with. This capability is used when a single data storage library is configured to operate as multiple logical libraries. In another embodiment, a portion of the cartridge memory is used to indicate the data storage library that the cartridge is associated with. The identifier may be a form of unique information associated with the particular library, such as a library serial number. This capability would enable the library controller to identify cartridges that may have been moved from one data storage library to another data storage library. This provides for more reliable management and tracking of data storage cartridges when cartridges are transported through the data storage library input/output station or in situations where a human operator physically moves cartridges between different data storage libraries.

For a more complete understanding of the present invention, reference should be made to the following detailed description taken in conjunction with the accompanying drawings.

BRIEF DESCRIPTION OF THE DRAWINGS

FIG. 9 is a flow chart depicting a use of the present invention to read association information from the cartridge memory when a cartridge is inserted into the library manually by the operator.

FIG. 10 is a flow chart depicting a use of the present invention to read association information from the cartridge memory during an inventory operation.

DETAILED DESCRIPTION OF THE PREFERRED EMBODIMENTS

This invention is described in preferred embodiments in the following description. The preferred embodiments are described with reference to the Figures. While this invention is described in conjunction with the preferred embodiments, it will be appreciated by those skilled in the art that it is intended to cover alternatives, modifications, and equivalents as may be included within the spirit and scope of the invention as defined by the appended claims.

Figure 1:
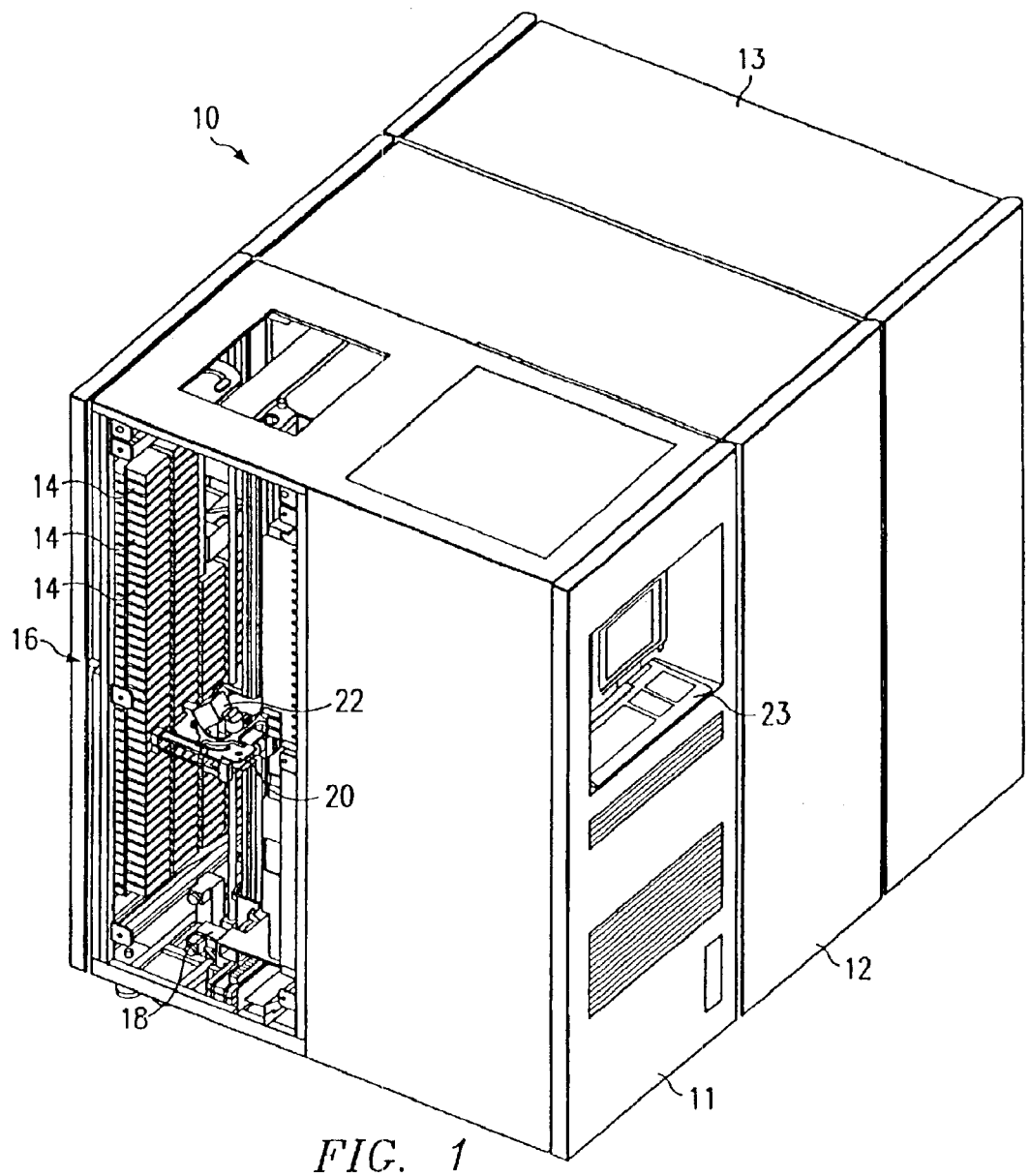
FIG. 1 is an isometric view of an automated data storage library in accordance with an embodiment of the present invention.

FIG. 1 illustrates an embodiment of an automated data storage library 10, in accordance with the present invention, which is arranged for accessing data storage media 14 (hereafter additionally referred to as cartridge, data cartridge, data storage cartridge or data storage media cartridge) in response to commands from at least one external host system, and comprises a plurality of storage shelves 16 for storing data storage media; at least one data storage drive for reading and/or writing data on the data storage media; and at least one robot accessor 18 for transporting the data storage media between the plurality of storage shelves 16 and the data storage drive(s). The library may also comprise an operator panel 23 or other user interface, such as a web-based interface, which allows a user to interact with the library. The library 10 may comprise one or more frames 11–13, each having storage shelves 16 accessible by the robot accessor 18. The robot accessor 18 comprises a gripper assembly 20 for gripping one or more data storage media 14, and may include a bar code scanner 22 or reading system, such as a smart card reader or similar system, mounted on the gripper 20, to "read" identifying information about the data storage media 14.

Figure 2:
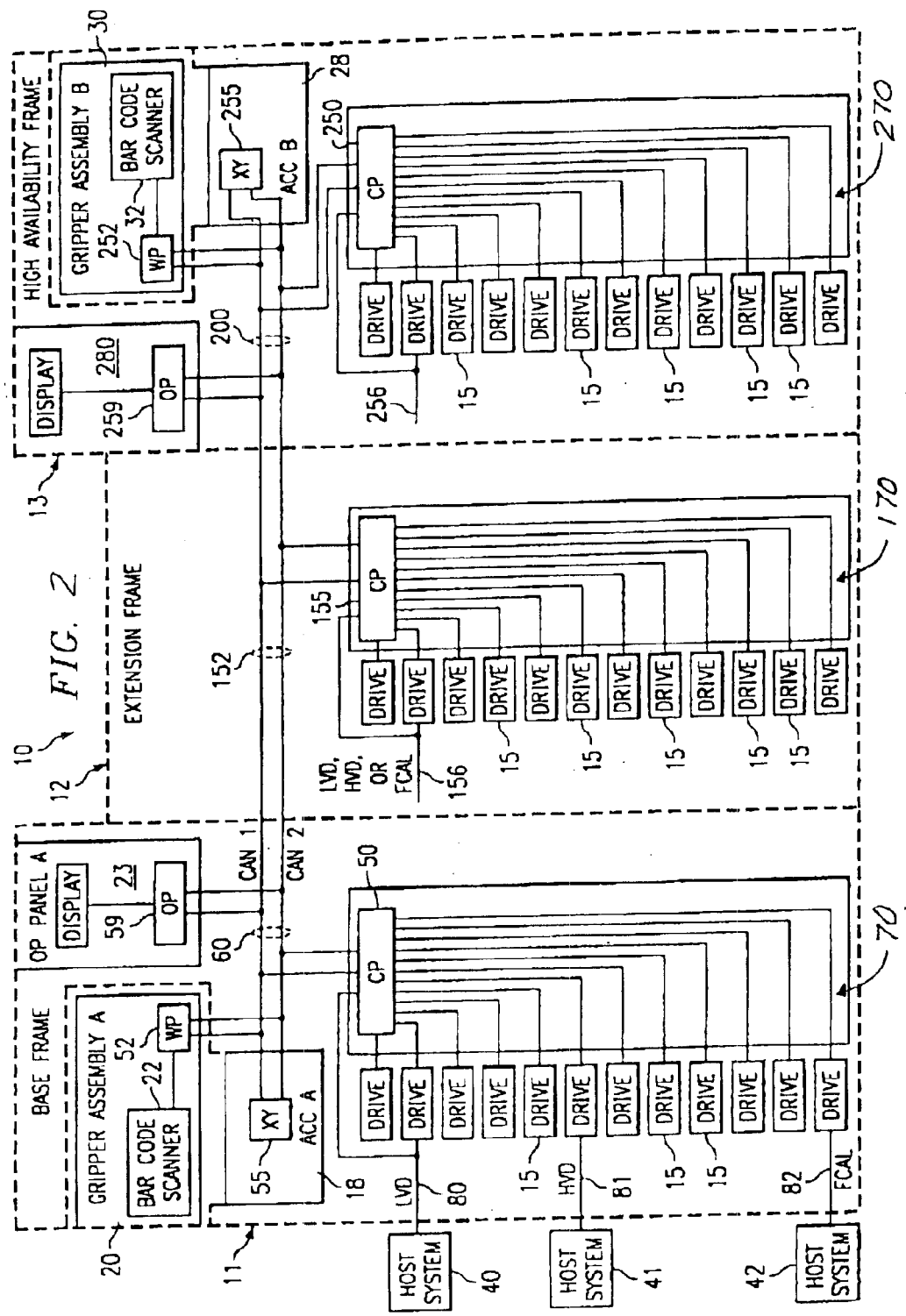
FIG. 2 is a block diagrammatic representation of an embodiment of an automated data storage library of FIG. 1.

FIG. 2 illustrates an embodiment of a data storage library 10 of FIG. 1, which employs a plurality of processor nodes. U.S. Pat. No. 6,356,803, entitled "Automated Data Storage Library Distributed Control System" describes such a control system and is hereby incorporated by reference. An example of a data storage library which may implement the present invention is the IBM 3584 Tape Library. The library comprises a base frame 11, may additionally comprise one or more extension frames 12, and may comprise a high availability frame 13.

The base frame 11 of the library 10 comprises one or more data storage drives 15, and a robot accessor 18. As discussed above, the robot accessor 18 comprises a gripper assembly 20 and may include a reading system 22 to "read" identifying information about the data storage media 14. The data storage drives 15, for example, may be optical disk drives or magnetic tape drives, and the data storage media 14 may comprise optical or magnetic tape media, respectively, or any other removable media and associated drives. As examples, a data storage drive may comprise an IBM LTO Ultrium Drive, may comprise a DLT 8000 Drive, etc. Additionally, a control port may be provided, which acts to communicate between a host and the library, e.g., receiving commands from a host and forwarding the commands to the library, but which is not a data storage drive.

The extension frame 12 comprises additional storage shelves, and may comprise additional data storage drives 15. The high availability frame 13 may also comprise additional storage shelves and data storage drives 15, and comprises a second robot accessor 28, which includes a gripper assembly 30 and may include a bar code scanner 32 or other reading device, and an operator panel 280 or other user interface. In the event of a failure or other unavailability of the robot accessor 18, or its gripper 20, etc., the second robot accessor 28 may take over.

Each of the robot accessors 18, 28 moves its gripper in at least two directions, called the horizontal "X" direction and vertical "Y" direction, to retrieve and grip, or to deliver and release the data storage media 14 at the storage shelves 16 and to load and unload the data storage media at the data storage drives 15.

Referring to FIG. 2, the library 10 receives commands from one or more host systems 40, 41 or 42. The host systems, such as host servers, communicate with the library directly, e.g., on path 80, through one or more control ports (not shown), or through one or more data storage drives 15, providing commands to access particular data storage media and move the media, for example, between the storage shelves and the data storage drives. The commands are typically logical commands identifying the media and/or logical locations for accessing the media.

The library is controlled by one or more processors, the processors receiving the logical commands and converting the commands to physical movements of the robot accessor 18, 28.

Figure 3:
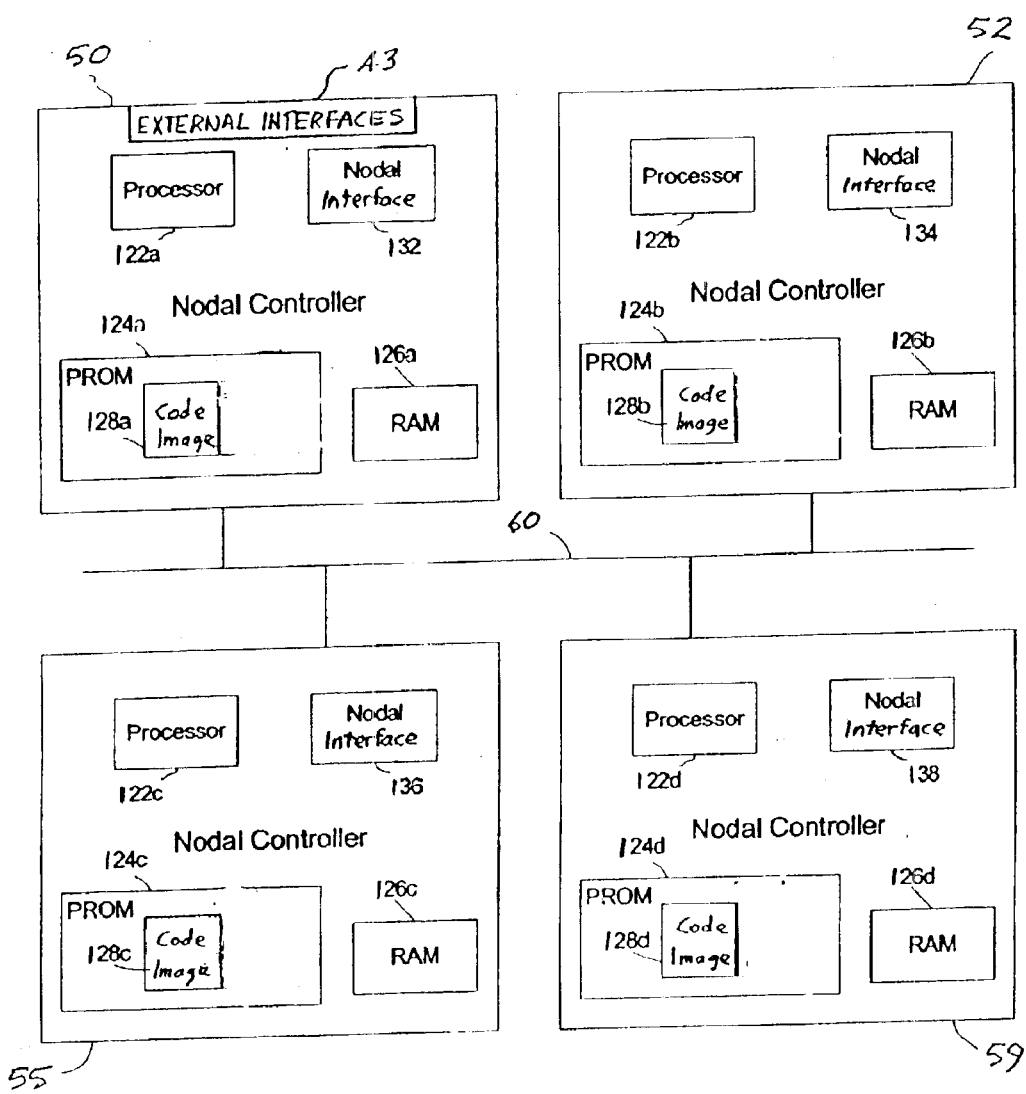
FIG. 3 is a block diagrammatic representation of a plurality of processor nodes of FIG. 2.

Referring additionally to FIG. 3, the processors may comprise a centralized control system, or a distributed control system of a plurality of processor nodes. In one example of a distributed control system, a communication processor node 50 may be located in the base frame 11. The communication processor node provides a communication link for receiving the host commands, either directly or from the drives 15, via at least one external interface 43. The communication processor node 50 may additionally provide a communication link 70 for operating and/or communicating with the data storage drives 15.

The communication processor node 50 may be located in the base frame 11, close to the data storage drives 15. Additionally, in an example of a distributed processor system, one or more additional work processor nodes are provided, which may comprise, e.g., a work processor node 52 that may be located at the robot accessor 18, and that is coupled to the communication processor node 50. Each work processor node may respond to received commands that are broadcast to the work processor nodes from any communication processor node, and the work processor node may also direct the operation of the robot accessor, providing move commands. An XY processor node 55 may be provided and may be located at an XY system of the robot accessor 18. The XY processor node 55 is coupled to the work processor node 52, and is responsive to the move commands, operating the XY system to position the gripper 20.

Also, an operator panel processor node 59 may be provided at the operator panel 23 for providing an interface for communicating between the operator panel and the communication processor node 50, the work processor node 52, and the XY processor node 55.

A common bus 60 may be provided, allowing communication between the various processor nodes. The common bus may comprise a redundant wiring network, such as the commercially available "CAN" bus system, which is a multi-drop network, having a standard access protocol and wiring standards, for example, as defined by CiA, the CAN in Automation Association, Am Weich selgarten 26, D-91058 Erlangen, Germany. Other similar bus networks, or a wireless network system, such as RF or infrared, may be employed in the library as is known to those of skill in the art. The processor nodes, e.g., nodes 50, 52, 55 and 59 of FIG. 3, may be coupled to the common bus 60 at a nodal interface 132, 134, 136 and 138.

Referring to FIG. 2, the communication processor node 50 is coupled to each of the data storage drives 15 of the base frame 11, via lines 70, communicating with the drives and with host systems 40, 41 and 42. Alternatively, the host systems may be directly coupled to the communication processor node 50 at input 80, or to control port devices (not shown) which connect the library to the host system(s) with a library interface similar to the drive/library interface. As is known to those of skill in the art, various communication arrangements may be employed for communication with the hosts and with the data storage drives. In the example of FIG. 2, host connections 80 and 81 are SCSI busses. Bus 82 comprises an example of a Fibre Channel-Arbitrated Loop which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70. A data storage drive 15 providing communication between a host system and the library is routed to an external interface 43 of FIG. 3.

An extension frame 12 may be provided, and may be coupled by an extension common bus 152 to the base frame common bus 60. Another communication processor node 155, similar to communication processor node 50 of FIG. 3, may be located in the extension frame and may communicate with hosts, e.g., at input 156, and data storage drives 15 in frame 12, e.g., via lines 170. Thus, commands from hosts may be received either directly, through a control port (not shown), or via the data storage drives, via an external interface, similar to external interface 43 of FIG. 3. The communication processor node 155 is coupled to the extension common bus 152 at a nodal interface such as nodal interface 132 of FIG. 3, the communication processor node 155 providing a communication link for the commands to the extension common bus 152, so that the commands are linked to the base frame common bus 60 and to the work processor node 52.

The communication processor node 155 may be mounted in the extension frame 12, closely adjacent to the coupled data storage drives 15 of the extension frame 12, communicating with the drives and with the attached host systems. The data storage drives 15 are also individually coupled to the communication processor node 155 by means of lines 170.

Additional extension frames with identical communication processor nodes 155, storage shelves 16, data storage drives 15, and extension busses 152, may be provided and each is coupled to the adjacent extension frame.

Further, the data storage library 10 may additionally comprise another robot accessor 28, for example, in a high availability frame 13. The robot accessor 28 may comprise a gripper 30 for accessing the data storage media, and an XY system 255 for moving the robot accessor. The high availability frame may be adjacent an extension frame 12, or adjacent the base frame 11, and the robot accessor 28 may run on the same horizontal mechanical path as robot accessor 18, or on an adjacent path. The exemplary control system additionally comprises an extension common bus 200 coupled to the extension common bus 152 of an extension frame or to the common bus 60 of the base frame. Another communication processor node 250 may be provided, which is also similar to communication processor node 50, and may be located in the high availability frame 13, for receiving commands from hosts, either directly at input 256, or through control ports (not shown), or through the data storage drives 15 and lines 270, e.g., at input 256, employing an external interface similar to external interface 43 illustrated in FIG. 3. The communication processor node 250 is coupled to the high availability frame extension common bus 200 and provides a communication link for the commands to the extension common bus, e.g., at a nodal interface 132 of FIG. 3.

The communication processor node 250 may be mounted closely adjacent to the coupled data storage drives 15 of the high availability frame 13, communicating with the drives and with the attached host systems. The data storage drives 15 are also individually coupled to the communication processor node 250 by means of lines 270, such as an RS-422 interface.

Referring to FIG. 2, a computer program implementing the present invention may be provided at one of the processor nodes, e.g., at work processor 52, or, optionally at processor 50, processor 155, or processor 250, or may be implemented in a plurality, or all, of the processor nodes.

Referring to FIG. 3, the processor nodes 50, 52, 55 and 59 comprise a processor 122a, b, c, d, which may comprise any microprocessor device known in the art. Examples of microprocessor devices may comprise processor chips, boards, PC's, RISC, work station computers, or specialized circuits. The processor 122a, b, c, d, operates under the control of program code, often called "firmware", since the code is related to the hardware constituting the library, as discussed above. The firmware is illustrated as a code image 128a, b, c, d, maintained in a nonvolatile memory 124a, b, c, d. The nonvolatile memory 124a, b, c, d may comprise any nonvolatile memory device known in the art, such as ROM (Read Only Memory), PROM (Programmable Read Only Memory), EEPROM (Electrically Erasable Programmable Read Only Memory), Flash PROM, battery backed-up RAM, CompactFlash™, SmartMedia™, hard disk drive, etc. In addition, the processor nodes may utilize work areas in RAM memory 126a, b, c, d, which may comprise any memory device known in the art. Alternatively, the nonvolatile memory 124a, b, c, d and/or RAM 126a, b, c, d may be located in processor 122a, b, c, d, respectively.

The firmware program code image may be the same for all of the processor nodes, having both common code and specific code for each of the various functions, but which specific code is only used by the processor of the specific function. Alternatively, different code images may be provided for each of the processor nodes, specifically incorporating only code required by the processor of the specific function. Herein, "firmware", "firmware code", "firmware code image", "code image", or "code", are defined as either code images which are the same for each processor node, or are specific to each processor node, or combinations thereof.

Figure 4:
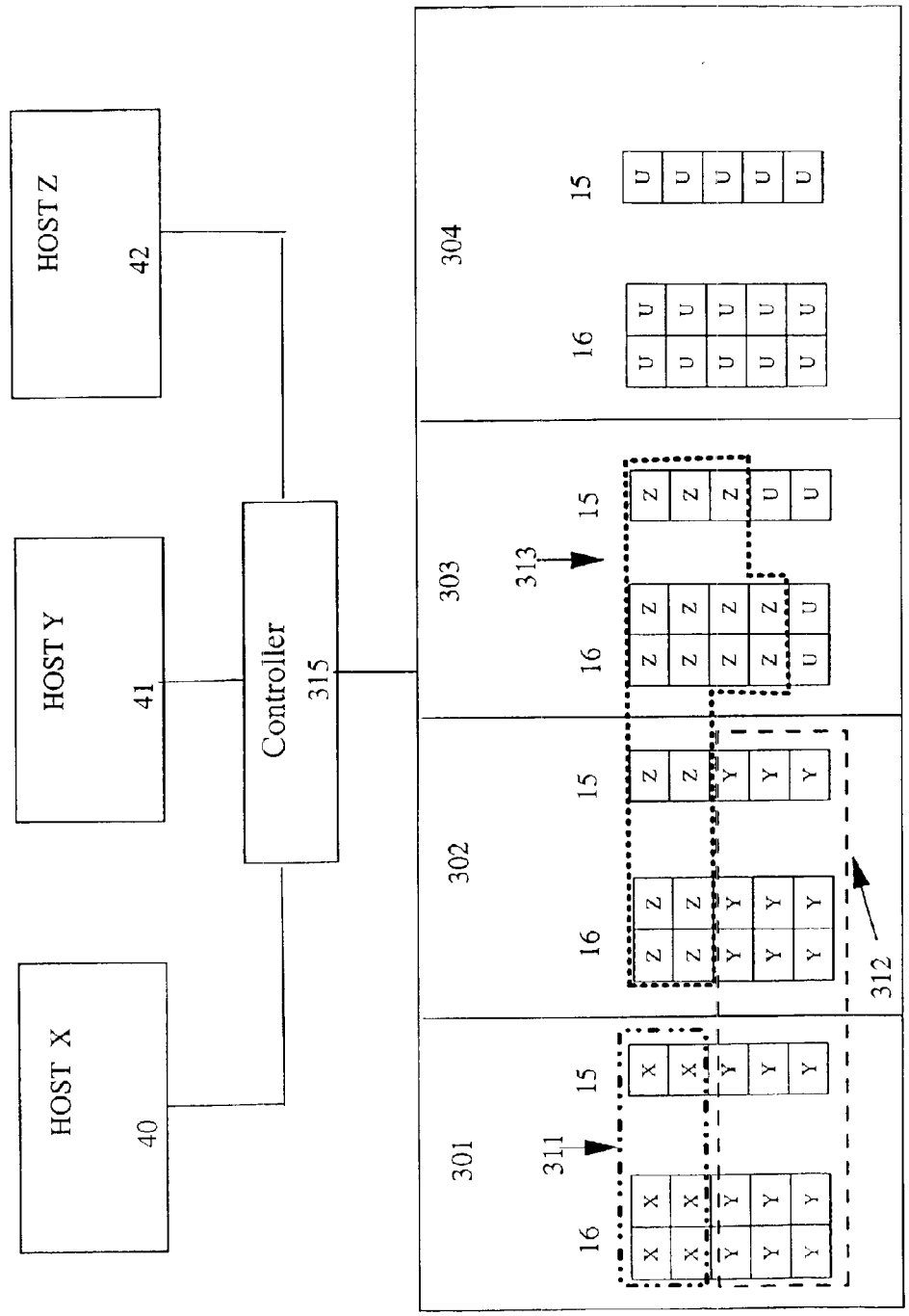
FIG. 4 is a block diagrammatic representation of an embodiment of an automated data storage library of FIG. 1, configured into three logical libraries.

FIG. 4 illustrates an embodiment of an automated data storage library 10, where the data storage library is composed of four library frames 301, 302, 303 and 304. The four library frames 301, 302, 303 and 304 comprises a base frame 11, may additionally comprise one or more extension frames 12, and may comprise a high availability frame 13. The four library frames are divided into three logical libraries 311, 312, and 313. Each frame has a plurality of storage shelves 16 and drives 15. The number of storage shelves 16 and drives 15 shown in FIG. 3 is for illustration purposes only and is not intended to limit the number of storage shelves 16 or drives 15 that may be used. The library controller 315 is an abstraction of the distributed control system of FIG. 3 and may comprise one or all of the nodal controllers 50, 52, 55 and 59. Hereafter, library controller refers to one or more processors working separately or together to provide various functions of the automated data storage library. The library controller may be located inside the automated data storage library, outside the automated data storage library, or combinations thereof. In this example three separate host computers 40, 41 and 42 interface to the library controller 315, however, more or less than three host computers may be used. The host computers 40, 41 and 42 may connect directly to the drives 15 or they may connect to the drives indirectly through the library controller 315. The drives 15 and the cartridges contained in storage shelves 16 of the library that constitute logical library 311 are associated with host computer 40 and are labeled with "X" in FIG. 3. The drives 15 and the cartridges contained in storage shelves 16 of the library that constitute logical library 312 are associated with host computer 41 and are labeled with "Y" in FIG. 3. The drives 15 and the cartridges contained in storage shelves 16 of the library that constitute logical library 313 are associated with host computer 42 and are labeled with "Z" in FIG. 3. The drives 15 and the cartridges contained in storage shelves 16 of the library that are not associated with any host computer are labeled with "U", and may be associated with any of the three host computers 40, 41 and 42 during an operation that may discover new cartridges, such as a change in the configuration of the library, during a cartridge Import/Export operation, during a library inventory, etc. This embodiment illustrated in FIG. 3 is not meant to limit the use of the invention to this example and one of ordinary skill in the art will recognize that the configuration, the layout, the number of host computers and number of components may vary from that illustrated in FIG. 3 and described herein.

Figure 5:
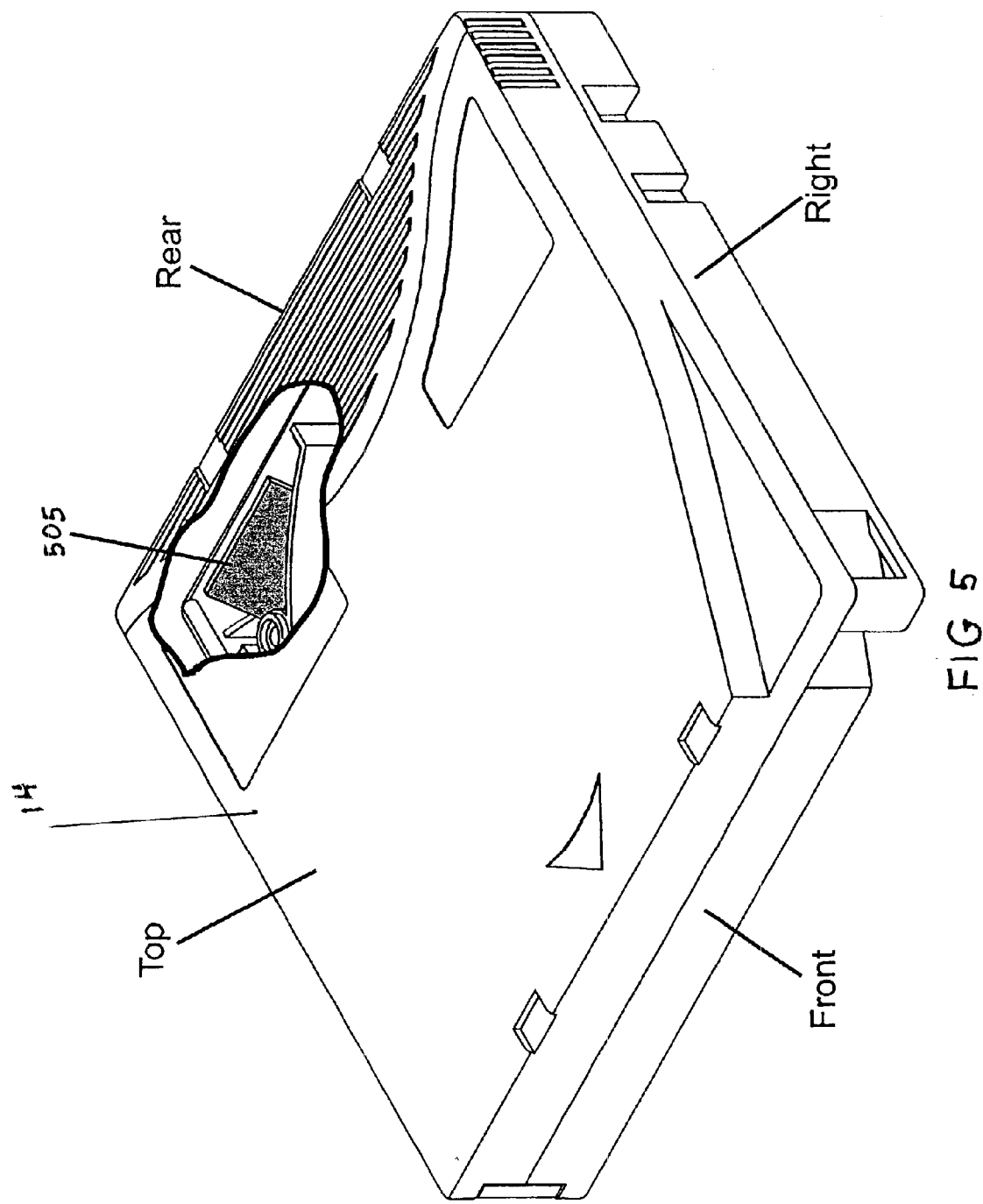
FIG. 5 is an isometric view of a data storage media cartridge containing a cartridge memory in accordance with one embodiment of the present invention.
Figure 6:
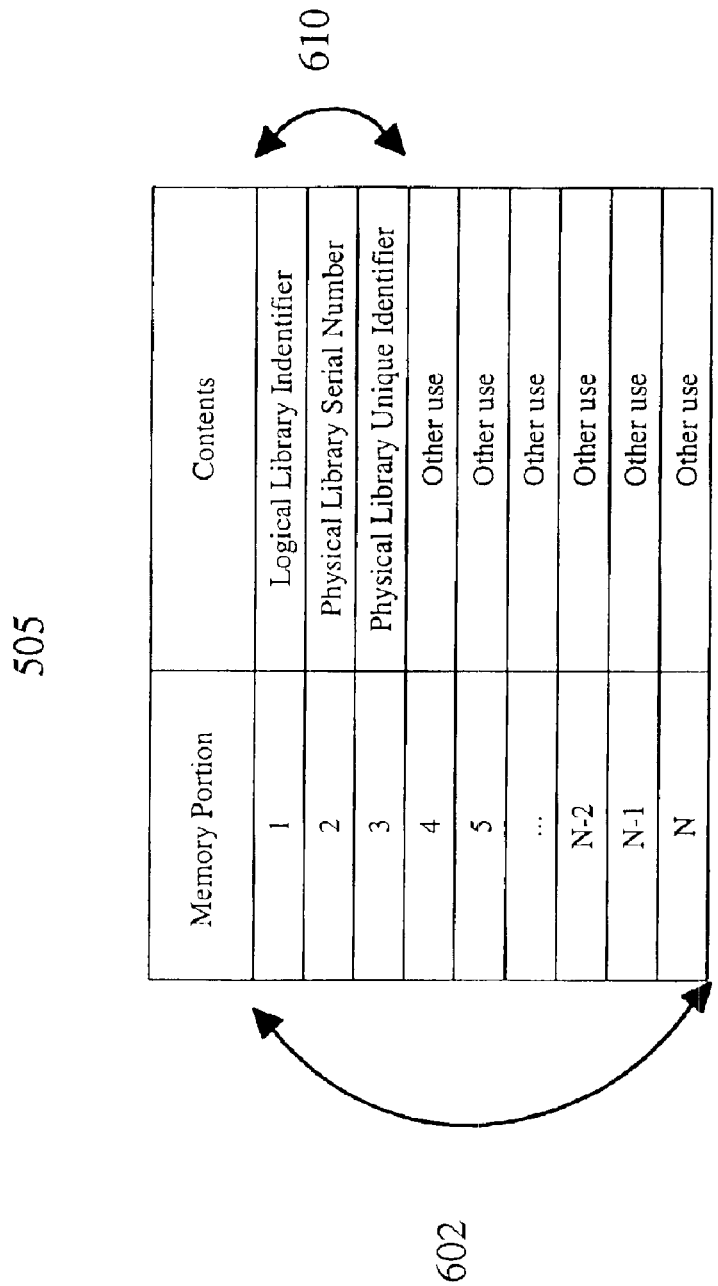
FIG. 6 is a block diagrammatic representation of the contents of cartridge memory for use by an embodiment of the present invention.

In accordance with the present invention and illustrated in FIG. 5 each data cartridge 14 located in the storage shelves 16 of any of the frames of the library may contain a cartridge memory 505. The cartridge memory 505 may contain information pertaining to the data stored on the media of the data cartridge as described in U.S. Pat. No. 57,859,655, the disclosure of which is incorporated herein by reference, and/or it may contain other information related to the use of the cartridge. Cartridge memory 505 is typically available in different capacities depending upon the use requirements. Referring to FIG. 6, cartridge memory 505 contains a plurality of memory portions 602 that may contain information related to the data stored on the media contained in the cartridge. For the present invention, a portion of the cartridge memory 505 is used to store association information 610 that identifies the logical and/or data storage library that the cartridge is associated with. The memory portion 602 for the logical library or data storage library association may contain numeric or other equivalent representations that serve as unique logical library and data storage library identifiers. An example of a logical library association is an 8 bit binary representation of a number between 0 and 255 where each number represents one of the logical libraries associated with a cartridge. More of the cartridge memory could be used to enable the use of a larger number than 255 if needed. An example of a data storage library association could be a binary or ASCII representation of the serial number of the data storage library associated with the cartridge. Other information may also be combined with either the logical library identifier or the data storage library identifier to produce a digital representation to be stored in the memory portions to provide a unique identifier for the associated logical library or data storage library. The identifier for the logical library is used in one embodiment to identify which logical library the cartridge belongs to. This is useful for libraries that do not maintain a fixed physical to logical mapping of cartridges. For example, a cartridge can reside in any physical storage shelve and still be associated with a particular logical library. The identifier for the data storage library, or physical library, is used in another embodiment to identify which physical library the cartridge belongs to. This is useful if a cartridge is moved between different physical libraries. For example, a cartridge may have been associated with logical library 2 in a physical library with serial number 3100577. If the cartridge were moved to another physical library, with serial number 3100594, then it may not be desired to maintain the logical library 2 association. The contents of cartridge memory 505 can be read or written by physically contacting the cartridge memory with electrical connections from a reader or writer device. The reading or writing device could be part of gripper assembly A 20, or gripper assembly B 30 (FIG. 2), or any gripper assembly of any library frame. The cartridge memory 505 could be read or written whenever the gripper contacts the cartridge, for example before, during or after transportation of the cartridge between the storage shelves 16, drives 15, or input/output station. The contents of cartridge memory 505 may also be read or written by wireless communication technology such as using the modulation of electromagnetic radiation to carry information between the cartridge memory and the reading and writing devices. The electromagnetic carrier radiation may span a range from radio frequencies to visible light. This contactless communication presents numerous advantages because the reader/writer in the gripper assembly only has to come in proximity of the cartridge memory to transfer information. Alternatively the contact or contactless read/writer may be incorporated into the read/write drive 15, enabling the reading and writing of the cartridge memory while the cartridge is in the drive. In this case, the drive may communicate the information to the library controller through lines 70 of FIG. 2.

Figure 7:
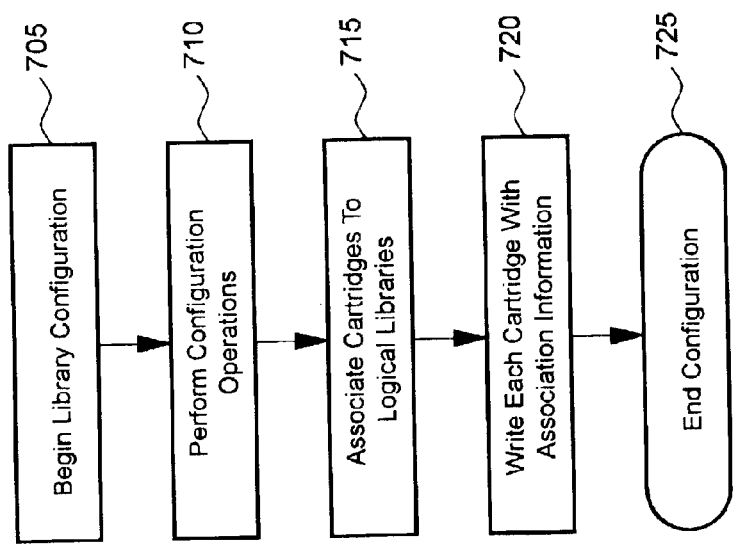
FIG. 7 is a flow chart depicting a use of the present invention to write association information to the cartridge memory during the configuration of the library.

One embodiment of the use of this invention during the configuration of the library is illustrated in the flowchart of FIG. 7. A library configuration process begins at step 705. This may be a manual process where an operator selects logical and physical items through a user interface, such as the operator panel 23, a web user interface, or some other interface. Alternatively, the library configuration process may be an automated process where the library controller 315 and/or host computer 40, 41, 42 initiates a configuration process after detecting new hardware components or user settings. Still further, the library configuration process may be a combination of any or all of these methods. At step 710, any physical and logical assignments take place. This may include the assignment of drives and data cartridges to logical libraries. For example, referring to FIG. 4, the two drives 15 (labeled "X") may be assigned to logical library 311 and the cartridges contained in storage shelves 16 (labeled "X") may be assigned to logical library 311. Referring again to FIG. 7, the association of cartridges to logical libraries is determined in step 715. The configuration process may assign associations to every cartridge in the configuration or it may only assign associations to cartridges that did not already have associations, depending on the desired results. In step 720, the association information is written to each cartridge. The library controller 315 may use a cartridge memory writer in the gripper or it may use the drive to perform the cartridge memory update. Alternatively, the cartridge memory writer may be located at some other location accessible by the library controller. Every cartridge in the library, or every cartridge in the configuration, or only affected cartridges may be written, or combinations thereof.

For example, if the association for a particular cartridge did not change as a result of a configuration process then it may not be necessary to update the cartridge memory for that cartridge. Step 725 concludes the library configuration process.

Figure 8:
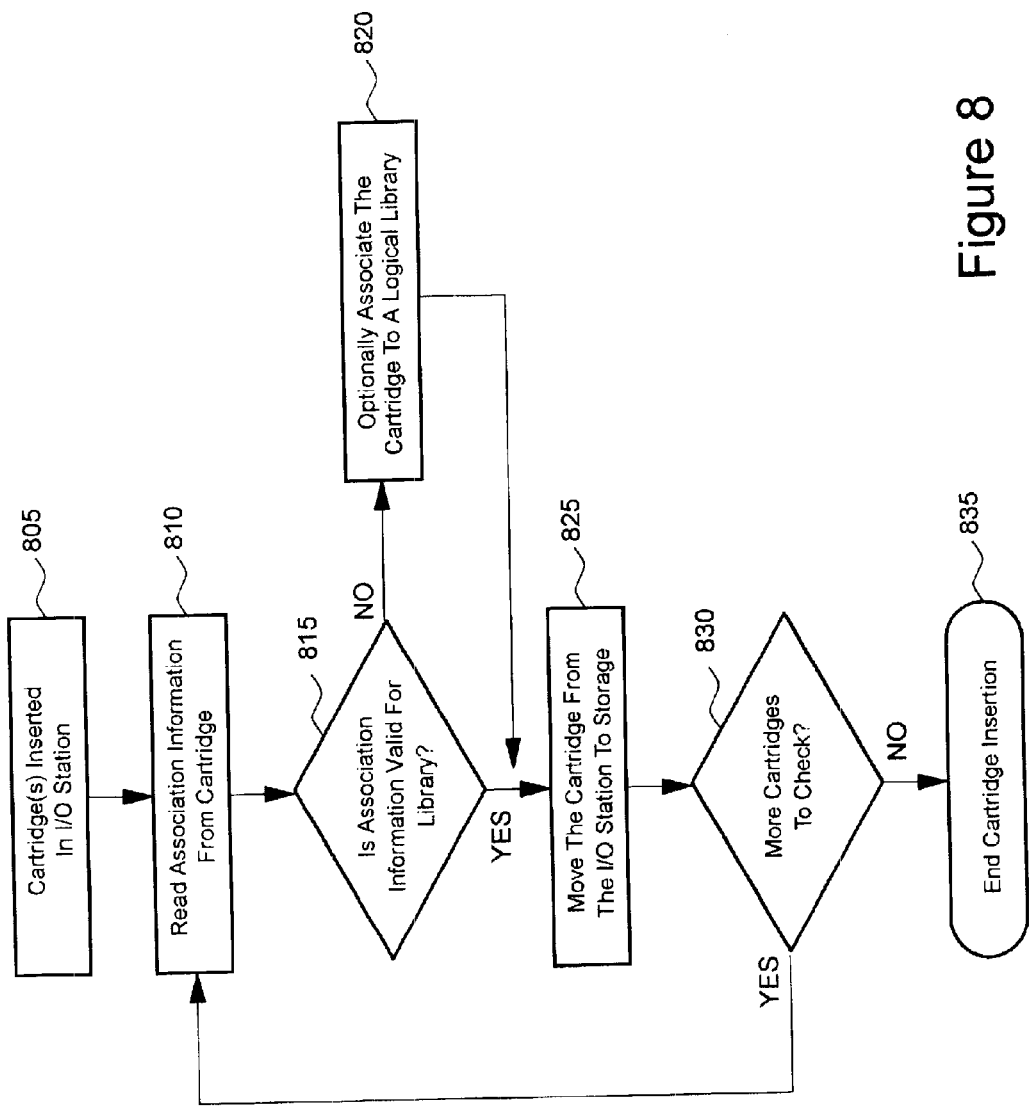
FIG. 8 is a flow chart depicting a use of the present invention to read association information from the cartridge memory when a cartridge is inserted into the library through the I/O station.

Another embodiment of the use of this invention when a cartridge is inserted into the library through an I/O station is illustrated in the flowchart of FIG. 8. One or more cartridges enters the I/O station at step 805. At step 810, the association information 610 is read from the cartridge memory 505 of the inserted cartridge by a reader in the library gripper or by a reader in a drive. Alternatively, the cartridge memory writer may be located at some other location accessible by the library controller. If the association information 610 is not valid for this library, as indicated in step 815, then control moves to step 820 where the cartridge is optionally associated to a logical library and the cartridge memory is written with the new association information 610. This association may be based on rules set by an operator at a user interface, by a host computer system, by the library controller 315, or combinations thereof. For example, this invention could be combined with cartridge label ranges, where invalid association information results in a logical library assignment based on the cartridge label. Alternatively, the cartridge may reside in an unassigned state until further action is taken. In this case, the cartridge association would occur at some later time during library operation, or not at all. For example, the cartridge may be reported as a import/export element until an import operation is performed. If the association information 610 is valid for this library, as indicated in step 815, then control moves to step 825 where the cartridge is optionally moved from the I/O station to an unused storage slot. This keeps the I/O station empty for any additional cartridge insertions that may occur. Alternatively, the cartridge may remain in the I/O station. For example, if step 820 did not assign any association information then it may be desired to leave the cartridge in the I/O station and skip step 825 so that a subsequent host or operator initiated cartridge move into a logical library would be used to associate the cartridge to that logical library. In step 830, a check is made to see if there are any other cartridges that have been inserted in the I/O station. If so, then control moves to step 810 to handle the additional cartridges. Otherwise, control moves to step 835 where the I/O station insert process ends.

Another embodiment of the use of this invention when one or more cartridges are manually inserted into the library by an operator or other person by opening the library and placing a cartridge(s) on one or more of the storage shelves 16 is illustrated in the flowchart of FIG. 9. One or more cartridges are manually inserted in the library at step 905. At step 910, the association information 610 is read from the cartridge memory 505 of the inserted cartridge by a reader in the library gripper or by a reader in a drive. Alternatively, the cartridge memory writer may be located at some other location accessible by the library controller. If the association information 610 is not valid for this library, as indicated in step 915, then control moves to step 920 where the cartridge is optionally associated to a logical library and the cartridge memory is written with the new association information 610. This association may be based on rules set by an operator at a user interface, by a host computer system, by the library controller 315, or combinations thereof. For example, this invention could be combined with cartridge label ranges where invalid association information results in a logical library assignment based on the cartridge label. Alternatively, the cartridge may reside in an unassigned state until further action is taken. In this case, the cartridge association would occur at some later time during library operation, or not at all. For example, the cartridge may be reported as a import/export element until an import operation is performed. As another example, if no cartridge association occurs at step 920 then any subsequent cartridge move into a logical library may be used to associate the cartridge to that logical library. If the association information 610 is valid for this library, as indicated in step 915, then control moves to step 930 where a check is made to see if there are any other cartridges that have been manually inserted in the library. If so, then control moves to step 910 to handle the additional cartridges. Otherwise, control moves to step 935 where the manual insert process ends.

Another embodiment of the use of this invention during the operation of the library is illustrated in the flowchart of FIG. 10. As part of normal library operation or after an initial power up sequence it may be desirable to inventory the cartridges in the library to determine the association information 610 of any or all of the cartridges in the library. The inventory operation begins at step 1005. This may have been caused by opening and closing a library door, a command issued by the host computer, a command issued by an operator at a library user interface, in response to a library error recovery procedure (ERP), etc. At step 1010, the association information 610 is read from the cartridge memory 505 of the cartridge being inventoried by a reader in the library gripper or by a reader in a drive. Alternatively, the cartridge memory writer may be located at some other location accessible by the library controller. If the association information 610 is not valid for this library, as indicated in step 1015, then control moves to step 1020 where the cartridge is optionally associated to a logical library and the cartridge memory is written with the new association information 610. This association may be based on rules set by an operator at a user interface, by a host computer system, by the library controller 315, or combinations thereof. For example, this invention could be combined with cartridge label ranges, where invalid association information results in a logical library assignment based on the cartridge label. Alternatively, the cartridge may reside in an unassigned state until further action is taken. In this case, the cartridge association would occur at some later time during library operation, or not at all. For example, the cartridge may be reported as a import/export element until an import operation is performed. As another example, if no cartridge association occurs at step 1020 then any subsequent cartridge move into a logical library may be used to associate the cartridge to that logical library. From step 1020, control moves either to step 1025 or step 1030, depending on the desired action of invalid association information. If the association information 610 is valid for this library, as indicated in step 1015, then control moves to step 1025 where the cartridge is added to the library inventory. At step 1030, a check is made to see if there are any other cartridges to inventory. If so, then control moves to step 1010 to handle the additional cartridges. Otherwise, control moves to step 1035 where the inventory process ends.

In another embodiment of this invention, the association of a cartridge to a logical library and/or to a physical library may be combined with existing techniques for tracking and utilizing cartridges within an automated data storage library. For example, the association data may be used for import/export operations where the cartridge memory of an exported cartridge is first written with association information and any subsequent import operation would automatically associate the cartridge with the proper logical library, eliminating the need for any manual intervention. Likewise, a new cartridge that's imported would not contain any valid association information and it would automatically be detected as a new cartridge. In another example, this invention may be combined with the technique of using cartridge label ranges to keep track of which logical library a cartridge belongs to. In this example, this invention may be used as backup to the cartridge label ranges where a failure to read the cartridge label would result in using the association information 610 from the cartridge memory 505 to identify the owning logical library. Or, the cartridge labels may be a backup to the association information 610 where invalid association information 610 would result in using the cartridge label to determine the owning logical library.

While the preferred embodiments of the present invention have been illustrated in detail, the skilled artisan will appreciate that modifications and adaptations to those embodiments may be made without departing from the scope of the present invention as set forth in the following claims.

What is claimed is:

1. An automated data storage library comprising:
a plurality of storage shelves for storing data storage cartridges, each of said data storage cartridges including a cartridge shell and a storage medium;
a library controller for operating said automated data storage library, said library controller further partitioning said automated data storage library into one or more logical libraries;
at least one data storage drive coupled to said library controller, said data storage drive used for reading and/or writing data on said data storage cartridges;
at least one accessor coupled to said library controller, said accessor used for transporting said data storage cartridges between said storage shelves and said data storage drive; and
a cartridge memory attached to said cartridge shell, said cartridge memory containing association information capable of being communicated to said library controller;
wherein said library controller receives said association information from said cartridge memory and uses said association information to associate one or more of said data storage cartridges with one or more of said logical libraries.

2. An automated data storage library comprising:
a plurality of storage shelves for storing data storage cartridges, each of said data storage cartridges including a cartridge shell and a storage medium;
a library controller for operating said automated data storage library, said library controller further partitioning said automated data storage library into one or more logical libraries;
at least one data storage drive coupled to said library controller, said data storage drive used for reading and/or writing data on said data storage cartridges;
at least one accessor coupled to said library controller, said accessor used for transporting said data storage cartridges between said storage shelves and said data storage drive; and
a cartridge memory attached to said cartridge shell, said cartridge memory containing association information capable of being communicated to said library controller;
wherein said library controller receives said association information from said cartridge memory and uses said association information to associate one or more of said data storage cartridges with said automated data storage library.

3. A data storage cartridge comprising:

a cartridge shell;

a storage medium for storing information; and a cartridge memory attached to said cartridge shell, said cartridge memory having a plurality of memory portions wherein at least one of said plurality of memory locations contains association information, said association information includes a logical library identifier and said logical library identifier is used to associate said data storage cartridge with a logical library.

4. The data storage cartridge of claim 3 wherein said plurality of memory portions are nonvolatile.

5. A data storage cartridge comprising:

a cartridge shell;

a storage medium for storing information; and a cartridge memory attached to said cartridge shell, said cartridge memory having a plurality of memory portions, wherein at least one of said plurality of memory locations contains association information, said association information includes an automated data storage library identifier and said automated data storage library identifier is used to associate said data storage cartridge with an automated data storage library.

6. The data storage cartridge of claim 5 wherein said plurality of memory portions are nonvolatile.

7. An automated information storage and retrieval system, said system comprising:

a plurality of storage shelves for storing data storage cartridges, each of said data storage cartridges including a cartridge shell and a storage medium;

a controller for operating said automated information storage and retrieval system, said controller further partitioning said automated information storage and retrieval system into one or more logical information storage and retrieval systems;

at least one information storage device coupled to said controller, said information storage device used for storage and retrieval of information on said data storage cartridges;

at least one accessor coupled to said controller, said accessor used for transporting said data storage cartridges between said storage shelves and said information storage device;

a cartridge memory attached to said cartridge shell, said cartridge memory containing at least one memory portion for storing association information; and a reader for reading said association information from said at least one memory portion of said cartridge memory;

wherein said controller receives said association information from said reader and uses said association information to associate one or more of said data storage cartridges with one or more of said logical information storage and retrieval systems.

8. The system of claim 7, wherein said association information comprises a logical information storage and retrieval system identifier.

9. The system of claim 7, wherein said association information comprises an automated information storage and retrieval system identifier.

10. The system of claim 7, wherein said controller receives said association information from said reader and uses said association information to associate one or more of said data storage cartridges with said automated information storage and retrieval system.

11. The system of claim 7 wherein said memory portion is nonvolatile.

12. The system of claim 7 wherein said reader is attached to said accessor.

13. The system of claim 7 wherein said reader is attached to said information storage device.

14. An automated information storage and retrieval system, said system comprising:

a plurality of storage shelves for storing data storage cartridges, each of said data storage cartridges including a cartridge shell and a storage medium;

a cartridge memory attached to said cartridge shell, said cartridge memory containing at least one memory portion for storing association information, wherein said association information comprises a logical information storage and retrieval system identifier;

a writer for writing said association information to said at least one memory portion of said cartridge memory;

a controller coupled to said writer for assigning said association information to said data storage media and directing said writer to write said association information to said at least one memory portion of said cartridge memory;

at least one information storage device coupled to said controller, said information storage device used for storage and retrieval of information on said data storage cartridges; and at least one accessor coupled to said controller, said accessor used for transporting said data storage cartridges between said storage shelves and said information storage device.

15. The system of claim 14, wherein said memory portion is nonvolatile.

16. The system of claim 14, wherein said writer is attached to said accessor.

17. The system of claim 14, wherein said writer is attached to said information storage device.

18. An automated information storage and retrieval system, said system comprising:

a plurality of storage shelves for storing data storage cartridges, each of said data storage cartridges including a cartridge shell and a storage medium;

a cartridge memory attached to said cartridge shell, said cartridge memory containing at least one memory portion for storing association information, wherein said association information comprises an automated information storage and retrieval system identifier;

a writer far writing said association information to said at least one memory portion of said cartridge memory;

a controller coupled to said writer for assigning said association information to said data storage media and directing said writer to write said association information to said at least one memory portion of said cartridge memory;

at least one information storage device coupled to said controller, said information storage device used for storage and retrieval of information on said data storage cartridges; and at least one accessor coupled to said controller, said accessor used for transporting said data storage cartridges between said storage shelves and said information storage device.

19. The system of claim 18, wherein said memory portion is nonvolatile.

20. The system of claim 18, wherein said writer is attached to said accessor.

21. The system of claim 18, wherein said writer is attached to said information storage device.

22. A method for partitioning an automated data storage library into multiple logical libraries, said automated data storage library having a plurality of data storage cartridges and a plurality of storage shelves for storing said data storage cartridges, said data storage cartridges each having a cartridge memory for holding association information, said association information including a logical library identifier, said automated data storage library having a controller for operating said automated data storage library, said automated data storage library having at least one accessor coupled to said controller, said accessor used for transporting said data storage cartridges, said automated data storage library having a reader coupled to said controller, said reader used for reading said cartridge memory, said method comprising the steps of:

said controller directing said reader to read said association information from said cartridge memory;

said controller receiving said association information from said reader; and said controller using said logical library identifier from said association information to associate one or more of said data storage cartridges to one or more of said multiple logical libraries.

23. The method of claim 22 wherein said association information additionally includes an automated data storage library identifier; and comprising the additional step of:

said controller using said automated data storage library identifier from said association information to associate one or more of said data storage cartridges to said automated data storage library.

24. A method for partitioning an automated data storage library into multiple logical libraries, said automated data storage library having a plurality of data storage cartridges and a plurality of storage shelves for storing said data storage cartridges, said data storage cartridges each having a cartridge memory for holding association information, said association information including a logical library identifier, said automated data storage library having a controller for operating said automated data storage library, said automated data storage library having a reader coupled to said controller, said reader used for reading said cartridge memory, said automated data storage library having at least one accessor coupled to said controller, said accessor used for transporting said data storage cartridges, said reader attached to said accessor, said method comprising the steps of:

said controller directing said accessor to position said reader in proximity of at least one of said plurality of data storage cartridges;

said controller directing said reader to read said association information from said cartridge memory;

said controller receiving said association information from said reader; and said controller using said logical library identifier from said association information to associate said at least one of said plurality of data storage cartridges to one or more of said multiple logical libraries.

25. The method of claim 24 wherein said association information additionally includes an automated data storage library identifier; and comprising the additional step of:

said controller using said automated data storage library identifier from said association information to associate said at least one of said plurality of data storage cartridges to said automated data storage library.

26. A method for partitioning an automated data storage library into multiple logical libraries, said automated data storage library having a plurality of data storage cartridges and a plurality of storage shelves for storing said data storage cartridges, said data storage cartridges each having a cartridge memory for holding association information, said association information including a logical library identifier, said automated data storage library having a controller for operating said automated data storage library, said automated data storage library having and a reader coupled to said controller, said reader used for reading said cartridge memory, said automated data storage library having at least one accessor coupled to said controller, said accessor used for transporting said data storage cartridges, said automated data storage library having at least one data storage drive coupled to said controller, said data storage drive used for reading and/or writing data on said data storage cartridges, said reader attached to said data storage drive, said method comprising the steps of:

said controller directing said accessor to position one of said data storage cartridges in said data storage drive;

said controller directing said data storage drive to read said association information from said cartridge memory;

said controller receiving said association information from said data storage drive; and said controller using said logical library identifier from said association information to associate said one of said cartridges to one or more of said multiple logical libraries.

27. The method of claim 26 wherein said association information additionally includes an automated data storage library identifier; and comprising the additional step of:

said controller using said automated data storage library identifier from said association information to associate said one of said cartridges to said automated data storage library.

28. A method for partitioning an automated data storage library into multiple logical libraries, said automated data storage library having a plurality of data storage cartridges and a plurality of storage shelves for storing said data storage cartridges, said data storage cartridges each having a cartridge memory for holding association information, said association information including a logical library identifier, said automated data storage library having a controller for operating said automated data storage library, said automated data storage library having at least one accessor coupled to said controller, said accessor used for transporting said data storage cartridges, said automated data storage library having a writer coupled to said controller, said writer used for writing said cartridge memory, said method comprising the steps of:

said controller constructing said logical library identifier of said association information to associate any of said data storage cartridges to any of said multiple logical libraries; and said controller directing said writer to write said association information to said cartridge memory.

29. The method of claim 28 wherein said association information additionally includes an automated data storage library identifier; and comprising the additional step of:

said controller constructing said automated data storage library identifier of said association information to associate any of said data storage cartridges to said automated data storage library.

30. A method for partitioning an automated data storage library into multiple logical libraries, said automated data storage library having a plurality of data storage cartridges and a plurality of storage shelves for storing said data storage cartridges, said data storage cartridges each having a cartridge memory for holding association information, said association information including a logical library identifier, said automated data storage library having a controller for operating said automated data storage library, said automated data storage library having and a writer coupled to said controller, said writer used for writing said cartridge memory, said automated data storage library having at least one accessor coupled to said controller, said accessor used for transporting said data storage cartridges, said writer attached to said accessor, said method comprising the steps of:

said controller constructing said logical library identifier of said association information to associate any of said data storage cartridges to any of said multiple logical libraries;

said controller directing said accessor to position said writer in proximity of at least one of said plurality of data storage cartridges; and said controller directing said writer to write said association information to said cartridge memory.

31. The method of claim 30 wherein said association information additionally includes an automated data storage library identifier; and comprising the additional step of:

said controller constructing said automated data storage library identifier of said association information associating any of said data storage cartridges to said automated data storage library.

32. A method for partitioning an automated data storage library into multiple logical libraries, said automated data storage library having a plurality of data storage cartridges and a plurality of storage shelves for storing said data storage cartridges, said data storage cartridges each having a cartridge memory for holding association information, said association information including a logical library identifier, said automated data storage library having a controller for operating said automated data storage library, said automated data storage library having and a writer coupled to said controller, said writer used for writing said cartridge memory, said automated data storage library having at least one accessor coupled to said controller, said accessor used for transporting said data storage cartridges, said automated data storage library having at least one data storage drive coupled to said controller, said data storage drive used for reading and/or writing data on said data storage cartridges, said writer attached to said data storage drive, said method comprising the steps of:

said controller constructing said logical library identifier of said association information to associate any of said data storage cartridges to any of said multiple logical libraries;

said controller directing said accessor to position one of said data storage cartridges in said data storage drive; and said controller directing said data storage drive to write said association information to said cartridge memory.

33. The method of claim 32 wherein said association information additionally includes an automated data storage Library identifier; and comprising the additional step of:

said controller constructing said automated data storage library identifier of said association information associating any of said data storage cartridges to said automated data storage library.

34. A computer program product on a computer-readable medium usable with a programmable computer, said computer program product having computer readable program code embodied therein for partitioning an automated data storage library into multiple logical libraries, said automated data storage library having a plurality of data storage cartridges and a plurality of storage shelves for storing said data storage cartridges, said data storage cartridges each having a cartridge memory for holding association information, said association information including a logical library identifier, said automated data storage library having a controller for operating said automated data storage library, said automated data storage library having at least one accessor coupled to said controller, said accessor used for transporting said data storage cartridges, said automated data storage library having a reader coupled to said controller, said reader used for reading said cartridge memory, said computer program product comprising:

computer readable program code which causes the reading of said association information from said cartridge memory;

computer readable program code which causes said controller to receive said association information from said reader; and computer readable program code which causes said controller to use said logical library identifier from said association information to associate one or more of said data storage cartridges to one or more of said multiple logical libraries.

35. The computer readable program product of claim 34 wherein said association information additionally includes an automated data storage library identifier; and further comprising;

computer readable program code that causes said controller to use said automated data storage library identifier from said association information to associate one or more of said data storage cartridges to said automated data storage library.

36. A computer program product on a computer-readable medium usable with a programmable computer, said computer program product having computer readable program code embodied therein for partitioning an automated data storage library into multiple logical libraries, said automated data storage library having a plurality of data storage cartridges and a plurality of storage shelves for storing said data storage cartridges, said data storage cartridges each having a cartridge memory for holding association information, said association information including a logical library identifier, said automated data storage library having a controller for operating said automated data storage library, said automated data storage library having a reader coupled to said controller, said reader used for reading said cartridge memory, said automated data storage library having at least one accessor coupled to said controller, said accessor used for transporting said data storage cartridges, said reader attached to said accessor, said computer program product comprising:

computer readable program code which causes said accessor to position said reader in proximity of one of said data storage cartridges;

computer readable program code which causes the reading of said association information from said cartridge memory;

computer readable program code which causes said controller to receive said association information from said reader; and computer readable program code which causes said controller to use said logical library identifier from said association information to associate one or more of said data storage cartridges to one or more of said multiple logical libraries.

37. The computer readable program product of claim 36 wherein said association information additionally includes an automated data storage library identifier, and further comprising;
   computer readable program code that causes said controller to use said automated data storage library identifier from said association information to associate one or more of said data storage cartridges to said automated data storage library.

38. A computer program product on a computer-readable medium usable with a programmable computer, said computer program product having computer readable program code embodied therein for partitioning an automated data storage library into multiple logical libraries, said automated data storage library having a plurality of data storage cartridges and a plurality of storage shelves for storing said data storage cartridges, said data storage cartridges each having a cartridge memory for holding association information, said association information including a logical library identifier, said automated data storage library having a controller for operating said automated data storage library, said automated data storage library having and a reader coupled to said controller, said reader used for reading said cartridge memory, said automated data storage library having at least one accessor coupled to said controller, said accessor used for transporting said data storage cartridges, said automated data storage library having at least one data storage drive coupled to said controller, said data storage drive used for reading and/or writing data on said data storage cartridges, said reader attached to said data storage drive, said computer program product comprising:
   computer readable program code which causes said controller to direct said accessor to position one of said data storage cartridges in said data storage drive;
   computer readable program code which causes the reading of said association information from said cartridge memory;
   computer readable program code which causes said controller to receive said association information from said data storage drive; and
   computer readable program code which causes said controller to use said logical library identifier from said association information to associate one or more of said data storage cartridges to one or more of said multiple logical libraries.

39. The computer readable program product of claim 38 wherein said association information additionally includes an automated data storage library identifier; and further comprising;
   computer readable program code that causes said controller to use said automated data storage library identifier from said association information to associate one or more of said data storage cartridges to said automated data storage library.

40. A computer program product on a computer-readable medium usable with a programmable computer, said computer program product having computer readable program code embodied therein for partitioning an automated data storage library into multiple logical libraries, said automated data storage library having a plurality of data storage cartridges and a plurality of storage shelves for storing said data storage cartridges, said data storage cartridges each having a cartridge memory for holding association information, said association information including a logical library, said automated data storage library having a controller for operating said automated data storage library, said automated data storage library having at least one accessor coupled to said controller, said accessor used for transporting said data storage cartridges, said automated data storage library having a writer coupled to said controller, said writer used for writing said cartridge memory, said computer program product comprising:
   computer readable program code which causes said controller to construct said logical library identifier of said association information to associate any of said data storage cartridges to any of said multiple logical libraries; and
   computer readable program code which causes said controller to direct said writer to write said association information to said cartridge memory.

41. The computer readable program product of claim 40 wherein said association information additionally includes an automated data storage library identifier, and further comprising:
   computer readable program code that causes said controller to construct said automated data storage library identifier of said association information to associate any of said data storage cartridge, to said automated data storage library.

42. A computer program product on a computer-readable medium usable with a programmable computer, said computer program product having computer readable program code embodied therein for partitioning an automated data storage library into multiple logical libraries, said automated data storage library having a plurality of data storage cartridges and a plurality of storage shelves for storing said data storage cartridges, said data storage cartridges each having a cartridge memory for holding association information, said association information including a logical library identifier, said automated data storage library having a controller for operating said automated data storage library, said automated data storage library having and a writer coupled to said controller, said writer used for writing said cartridge memory, said automated data storage library having at least one accessor coupled to said controller, said accessor used for transporting said data storage cartridges, said writer attached to said accessor, said computer program product comprising:
   computer readable program code which causes said controller to construct said logical library identifier of said association information to associate any of said data storage cartridges to any of said multiple logical libraries;
   computer readable program code which causes said controller to direct said accessor to position said writer in proximity of at least one of said plurality of data storage cartridges; and
   computer readable program coda which causes said controller to direct said writer to write said association information to said cartridge memory.

43. The computer readable program product of claim 42 wherein said association information additionally includes an automated data storage library identifier; and further comprising;
   computer readable program code that causes said controller to construct said automated data storage library identifier of said association information associating any of said data storage cartridges to said automated data storage library.

44. A computer program product on a computer-readable medium usable with a programmable computer, said computer program product having computer readable program code embodied therein for partitioning an automated data storage library into multiple logical libraries, said automated data storage library having a plurality of data storage cartridges and a plurality of storage shelves for storing said data storage cartridges, said data storage cartridges each having a cartridge memory for holding association information, said association information including a logical library identifier, said automated data storage library having a controller for operating said automated data storage library, said automated data storage library having and a writer coupled to said controller, said writer used for writing said cartridge memory, said automated data storage library having at least one accessor coupled to said controller, said accessor used for transporting said data storage cartridges, said automated data storage library having at least one data storage drive coupled to said controller, said data storage drive used for reading and/or writing data on said data storage cartridges, said writer attached to said data storage drive, said computer program product comprising:

computer readable program code which causes said controller to construct said logical library identifier of said association information to associate any of said data storage cartridges to any of said multiple logical libraries;

computer readable program code which causes said controller to direct said accessor to position one of said data storage cartridges in said data storage drive; and computer readable program code which causes said controller to direct said data storage drive to write said association information to said cartridge memory.

45. The computer readable program product of claim 44 wherein said association information additionally includes an automated data storage library identifier; and further comprising;

computer readable program code that causes said controller to construct said automated data storage library identifier of said association information associating any of said data storage cartridges to said automated data storage library.

* * * * *